United States Patent
Ha et al.

(10) Patent No.: US 11,558,716 B2
(45) Date of Patent: Jan. 17, 2023

(54) DEVICE AND METHOD FOR POSITIONING PERSONAL MOBILITY VEHICLE

(71) Applicants: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

(72) Inventors: Jae Jun Ha, Hwaseong-si (KR); Gu Min Jeong, Seoul (KR); Hyun Jung Oh, Seoul (KR); Seung Hyeon Lee, Seoul (KR)

(73) Assignees: HYUNDAI MOTOR COMPANY, Seoul (KR); KIA CORPORATION, Seoul (KR); KOOKMIN UNI. INDUS. ACADEMY COOPERATION FOUNDATION, Seoul (KR)

(*) Notice: Subject to any disclaimer, the term of this patent is extended or adjusted under 35 U.S.C. 154(b) by 0 days.

(21) Appl. No.: 17/404,024

(22) Filed: Aug. 17, 2021

(65) Prior Publication Data

US 2022/0060852 A1 Feb. 24, 2022

(30) Foreign Application Priority Data

Aug. 21, 2020 (KR) .................. 10-2020-0105657
Aug. 21, 2020 (KR) .................. 10-2020-0105658
Apr. 23, 2021 (KR) .................. 10-2021-0052738

(51) Int. Cl.
*H04W 4/029* (2018.01)
*H04W 4/40* (2018.01)
*H04W 4/02* (2018.01)
*G01S 19/07* (2010.01)

(52) U.S. Cl.
CPC .......... *H04W 4/029* (2018.02); *H04W 4/023* (2013.01); *H04W 4/40* (2018.02); *G01S 19/07* (2013.01)

(58) Field of Classification Search
CPC .......... G08G 1/0116; G08G 1/096783; H04W 4/029; H04W 4/025; H04W 4/40; H04W 4/023; G01S 5/14; G01S 19/46; G01S 13/931; G01S 17/931; G01S 19/42; G01S 5/0284; G01S 19/07
See application file for complete search history.

(56) References Cited

FOREIGN PATENT DOCUMENTS

| CN | 106443741 A | * | 2/2017 | ............. G01S 19/46 |
|----|-------------|---|--------|-------------------------|
| CN | 106767783 A | * | 5/2017 | ............. G01C 21/165 |
| CN | 108615364 A | * | 10/2018 | ............. G08G 1/0104 |

(Continued)

*Primary Examiner* — Dung Hong
(74) *Attorney, Agent, or Firm* — McDonnell Boehnen Hulbert & Berghoff LLP (57) ABSTRACT

A device and method for positioning personal mobility vehicle are disclosed. The positioning method is implemented by a computer and comprises receiving messages from a plurality of auxiliary road side units, obtaining distances between a Personal Mobility (PM) vehicle and the plurality of auxiliary road side units based on the messages, estimating a candidate position of the PM vehicle based on the distances between the PM vehicle and the plurality of auxiliary road side units, receiving correction data from a reference road side unit, correcting the candidate position based on the correction data, and determining the corrected candidate position as a final position of the PM vehicle.

8 Claims, 4 Drawing Sheets

(56) References Cited

FOREIGN PATENT DOCUMENTS

| CN | 109633543 | A | * | 4/2019 | | |
|----|-----------|---|---|--------|---|---|
| CN | 110133697 | A | * | 8/2019 | ............ | G01S 19/45 |
| CN | 110673179 | A | * | 1/2020 | ............ | G01S 19/40 |
| WO | WO-2016107303 | A1 | * | 7/2016 | ............ | G01S 19/45 |

* cited by examiner

DEVICE AND METHOD FOR POSITIONING PERSONAL MOBILITY VEHICLE

CROSS REFERENCE TO RELATED APPLICATIONS

This application is based on, and claims priority from, Korean Patent Application Number 10-2020-0105657 filed on Aug. 21, 2020, Korean Patent Application Number 10-2020-0105658 filed on Aug. 21, 2020, and Korean Patent Application Number 10-2021-0052738 filed on Apr. 23, 2021, the disclosure of each of which is incorporated by reference herein in its entirety.

TECHNICAL FIELD

Embodiments of the present disclosure relate to a device and method for positioning a personal mobility vehicle using V2X communication, and more particularly, to a device and method for positioning a personal mobility vehicle using a reference road side unit and a plurality of auxiliary road side units.

BACKGROUND

The statements described in this section merely provide background information for the present disclosure and does not constitute the related art.

As a moving means or a transportation means, the proportion of vehicles is decreasing, and the proportion of Personal Mobility vehicles (PM vehicles) is gradually increasing. Here, the PM vehicle is a moving object and means a moving means including an electric kickboard, a bike, a smart car, a vehicle, a Purpose-Built Vehicle (PBV), an air vehicle, and the like.

Meanwhile, a Global Navigation Satellite System (GNSS) based on satellite signals is generally used to identify positions of PM vehicles. An example of the GNSS may include a Global Positioning System (GPS). Vehicle to Everything (V2X) standard technologies applied to intelligent transportation systems also estimate positions of vehicles based on the GPS.

A Global Positioning System (GPS) is a positioning technology used worldwide and is one of the most used positioning systems among technologies developed to date.

However, in general, an error range for positioning using the GPS is a range of 5 to 15 m, and an error may be up to 30 m, and thus the GPS does not satisfy the performance for general PM vehicle safety technology.

In particular, in urban areas with many high-rise buildings, GPS signals are diffusely reflected by high-rise buildings. The GPS diffused reflection may prevent the GPS signals from being transmitted to a destination at a shortest distance, thereby reducing the accuracy of positioning. In addition, since it is difficult to receive satellite signals in a GPS dead zone such as an indoor parking lot, it is more difficult to determine the positions of the vehicles.

To solve this problem, additional devices are used in GPS shadow areas or urban areas. In the positioning method using the GPS, in addition to the GPS technology, a map matching technology that displays positions of vehicles as positions on the nearest road may be used. In addition, through an Inertial Navigation System (INS), it is possible to reduce the inaccuracy of the GPS and to receive additional information necessary for positioning in a GPS dead zone. However, even when both the GPS and INS are used, there is a limit to reducing the positioning error because the position is estimated based on the satellite signals transmitted from the satellites.

If a technology for providing signal information to vehicles using the GPS is applied to the PM vehicles, a problem due to a GPS positioning error may be further highlighted. This is because, unlike vehicles that travel only on the road, the PM vehicles can travel along various routes, such as sidewalks, roads, bike roads, or alleys. That is, when traffic information is provided to the PM vehicles through GPS positioning, there is a problem in that it is difficult to transmit necessary information to the PM vehicles due to a positioning error.

Therefore, it is necessary to accurately identify positions of PM vehicles prior to providing various services to the PM vehicles.

SUMMARY

According to at least one embodiment, the present disclosure provides a positioning method implemented by a computer, comprising receiving messages from a plurality of auxiliary road side units, obtaining distances between a Personal Mobility Vehicle (PM vehicle) and the plurality of auxiliary road side units based on the messages, estimating a candidate position of the PM vehicle based on the distances between the PM vehicle and the plurality of auxiliary road side units, receiving correction data from a reference road side unit, correcting the candidate position based on the correction data, and determining the corrected candidate position as a final position of the PM vehicle.

According to another embodiment, the present disclosure provides a positioning device comprising a communication unit configured to communicate with a plurality of auxiliary road side units through messages and receive correction data from a reference road side unit, and a control unit configured to obtain distances between a Personal Mobility vehicle (PM vehicle) and the plurality of auxiliary road side units based on the messages, estimate a candidate position of the PM vehicle based on the distances between the PM vehicle and the plurality of auxiliary road side units, correct the candidate position based on the correction data, and determine the corrected candidate position as a final position of the PM vehicle.

DETAILED DESCRIPTION

The present disclosure in some embodiments seek to provide a device and method for positioning a PM vehicle for providing an accurate position of the PM vehicle using a plurality of road side units and V2X communication even in a global navigation Satellite System (GNSS) dead-zone or an area where diffused reflection of a satellite signal is severe.

Hereinafter, some embodiments of the present disclosure will be described with reference to the exemplary drawings.

It is to be noted that in giving reference numerals to components of the accompanying drawings, the same components will be denoted by the same reference numerals even when the components are illustrated in different drawings. In describing the present disclosure, when it is determined that a detailed description of related known functions or configurations may obscure the subject matter of the present disclosure, the detailed description thereof will be omitted.

In addition, in describing the components of the present disclosure, terms such as first, second, A, B, (a), (b), etc. may be used. These terms are used only in order to distinguish any component from other components, and features, sequences, or the like, of corresponding components are not limited by these terms. Throughout the present specification, unless explicitly described to the contrary, "including" and "comprising" any components will be understood to imply the inclusion of other elements rather than the exclusion of any other elements. A term such as "part," "module," or the like described in the specification means a unit of processing at least one function or operation and may be implemented as hardware or software or a combination of hardware and software.

Hereinafter, a Personal Mobility Vehicle (hereinafter referred to as PM vehicle) means a moving object. Examples of the PM vehicle include a micro mobility vehicle, an electric bicycle, an electric kickboard, an electric scooter, an electric wheelchair, an electric bike, a Segway®, a 2-wheel drive vehicle, a smart car, a shuttle, a personal moving means, a personal flying means, a smart mobility vehicle, a shared mobility vehicle, first mile vehicle, last mile vehicle, a Purpose Built Vehicle (PBV), a personal air vehicle (PAV), a vehicle, an electric vehicle, or the like.

In addition, an Intelligent Transport System (ITS) includes a Road Side Unit (RSU) or a mobile communication base station. All RSUs (RSUs) or base stations perform broadcasting but may support communication methods such as unicast and multicast, if necessary. Hereinafter, the RSUs (RSU) will be described on the basis of performing Vehicle to Everything (V2X) communication with a PM vehicle. The V2X communication includes LTE-V2X, C-V2X, 5G-V2X, Wireless Access in Vehicular Environment (WAVE), Dedicated Short-Range Communication (DSRC), or the like. In addition, communication protocols used in the ITS may be used. Hereinafter, terms between the RSU and the base station may be used interchangeably.

The positioning device may be implemented as a server positioned outside the PM vehicle. In addition, a positioning device may be implemented by a device positioned inside the PM vehicle, a user terminal, or the like. The positioning device may store, in advance, at least one of a virtual map, identification information of the RSU, position coordinates corresponding to the identification information of the RSU, identification information of the PM vehicle, and subscriber information of a user. Here, the position coordinates mean a latitude and a longitude or mean two-dimensional or three-dimensional coordinates based on a specific point. Hereinafter, it will be described that the positioning device is mounted on the PM vehicle.

Meanwhile, the positioning device may include one or more components that enable communication with an external device and may include at least one of a short-range communication module and a wireless communication module.

The short-range communication module may include various short-range communication modules that transmit/receive a signal using a wireless communication network at a short range such as a Bluetooth module, an infrared communication module, a Radio Frequency Identification (RFID) communication module, an ultra-wide band (UWB), a Wireless Local Access Network (WLAN) communication module, a Near Field Communication (NFC) communication module, and a ZigBee communication module.

The wireless communication module may include a wireless communication module supporting various wireless communication methods such as V2X, Cellular-V2X (C-V2X), Wireless Access in Vehicle Environment (WAVE), Dedicated Short-Range Communication (DSRC), Wi-Fi module, Long Term Evolution (LTE), and New Radio (NR). Hereinafter, a message means a message used in each wireless communication method.

Figure 1:
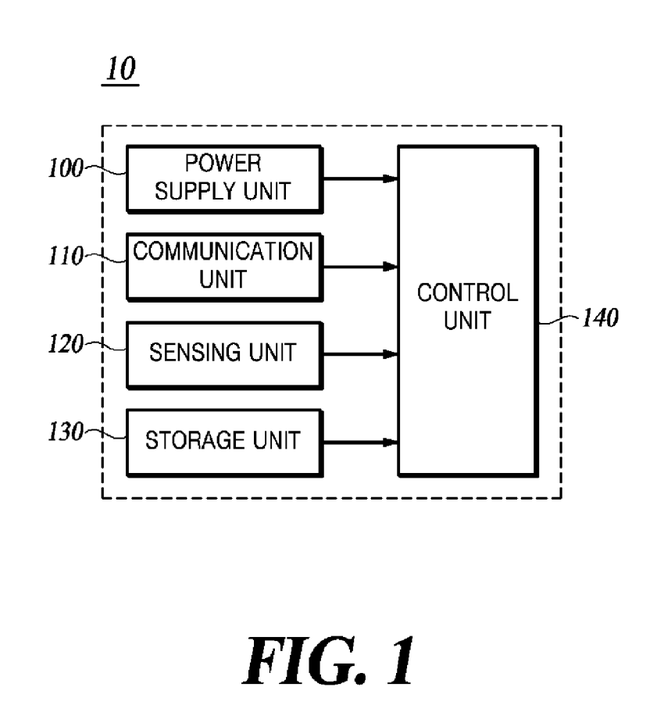
FIG. 1 is a configuration diagram illustrating components of a positioning device according to an embodiment of the present disclosure.

FIG. 1 is a configuration diagram illustrating components of a positioning device according to an embodiment of the present disclosure.

Referring to FIG. 1, a positioning device 10 includes a power supply unit 100, a communication unit 110, a sensing unit 120, a storage unit 130, and a control unit 140.

The power supply unit 100 is a component that supplies power to the components in the positioning device 10.

The communication unit 110 is a component that performs communication with the ITS. That is, the communication unit 110 is a component that communicates with a plurality of auxiliary RSUs through messages and receives correction data from a reference RSU. The communication unit 110 may communicate with a server through RSUs.

The sensing unit 120 is a component that receives the position of the PM vehicle. The sensing unit 120 may receive the position of the PM vehicle using a module such as Navigation Satellite System (GNSS), Differential Global Positioning System (DGPS), or Carrier-phase DGPS (CDGPS). Receiving the position by the sensing unit 120 is distinguished from estimating the position of the PM vehicle using the RSUs. According to an embodiment of the present disclosure, when the position of the PM vehicle is not estimated by the sensing unit 120, a positioning method may be performed.

The control unit 140 is a component for estimating the position of the PM vehicle based on the messages and the correction data.

Hereinafter, the PM vehicle positioning process of the control unit 140 will be described.

The control unit 140 receives messages from a plurality of auxiliary RSUs through the communication unit 110.

Thereafter, the control unit 140 obtains distances between a PM vehicle and a plurality of auxiliary RSUs based on the messages. According to an embodiment of the present disclosure, the control unit 140 may calculate the distances from the PM vehicle to the plurality of auxiliary RSUs based on at least one of a Received Signal Strength Indicator (RSSI) and a Time of Flight (ToF) of the messages.

The control unit 140 estimates a candidate position of the PM vehicle based on the distances between the PM vehicle and the plurality of auxiliary RSUs. For example, the control unit 140 may estimate the candidate position of the PM vehicle by applying a positioning method such as triangulation, trilateration and a fingerprint technique to the distances between the PM vehicle and the plurality of auxiliary RSUs.

The control unit 140 receives the correction data from the reference RSU and corrects the candidate position based on the correction data.

According to an embodiment of the present disclosure, the correction data means any one of distance error ratios between the reference RSU and the plurality of auxiliary RSUs, distance errors between the reference RSU and the plurality of auxiliary RSUs, and a position error of the reference RSU.

Specifically, the distance error ratios between the reference RSU and the plurality of auxiliary RSUs mean ratios of actual distances to estimated distances between the reference RSU and the plurality of auxiliary RSUs. That is, the distance error ratios are the actual distances over the estimated distances.

The distance errors between the reference RSU and the plurality of auxiliary RSUs mean between the actual distances to the estimated distances from the reference RSU to the plurality of auxiliary RSUs.

The position error of the reference RSU means the difference between the estimated position and the actual position of the reference RSU.

The control unit 140 may correct the candidate position of the PM vehicle by applying the correction data to the candidate position of the PM vehicle.

Finally, the control unit 140 determines that the corrected candidate position is a final position of the PM vehicle.

Figure 2A:
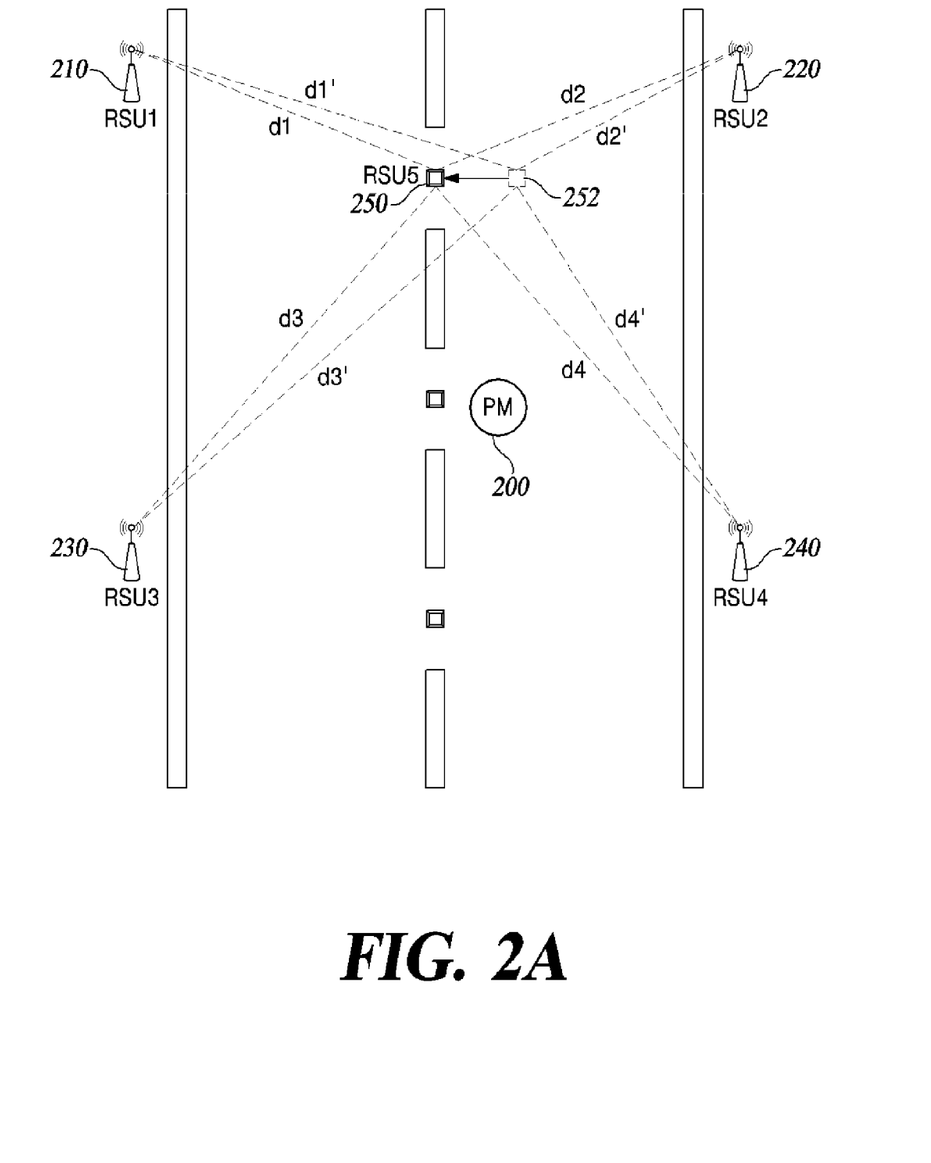
FIGS. 2A and 2B are exemplary diagrams for describing a process of estimating an accurate position of a PM vehicle according to an embodiment of the present disclosure.
Figure 2B:
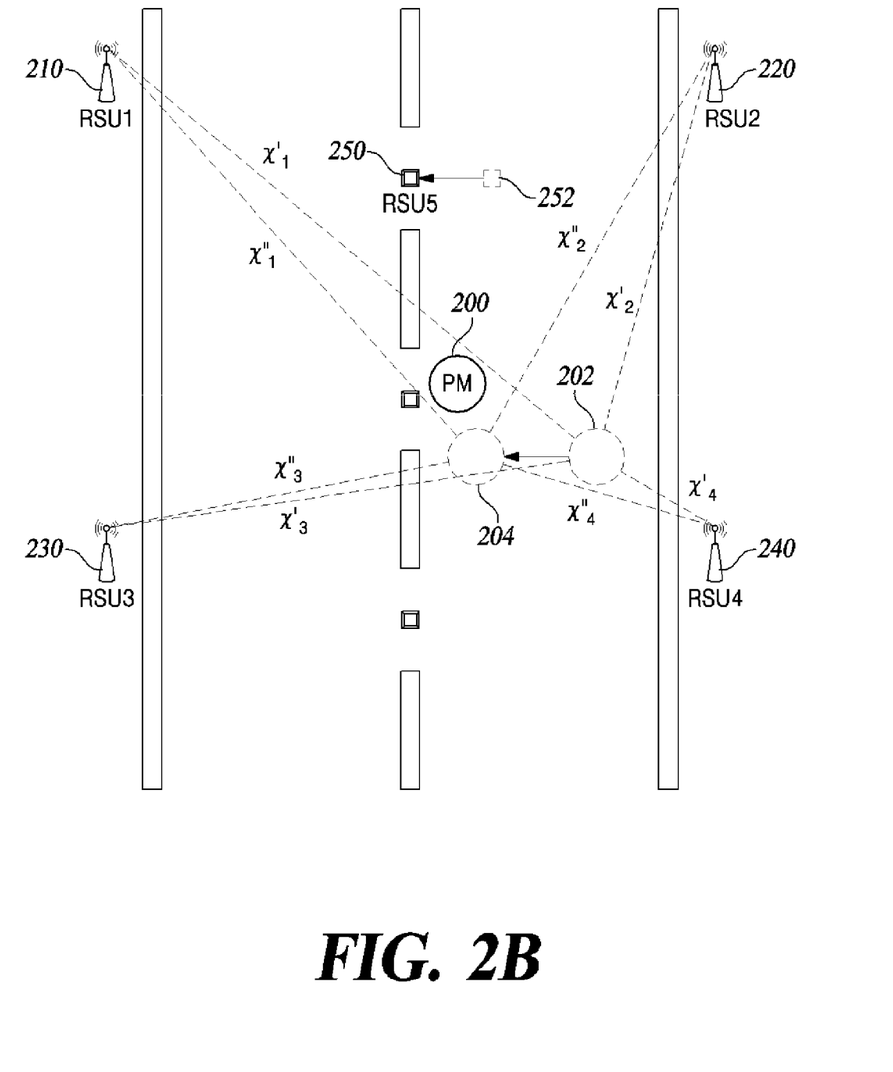

FIGS. 2A and 2B are exemplary diagrams for describing a process of estimating an accurate position of a PM vehicle according to an embodiment of the present disclosure.

In detail, FIG. 2A is a diagram for describing a process of generating correction data. FIG. 2B is a diagram for describing a process of correcting the candidate position of the PM vehicle based on the correction data.

Referring to FIG. 2A, an actual position 200 of a PM vehicle, a plurality of RSUs 210, 220, 230, 240, and 250, and an estimated position 252 of a fifth RSU are illustrated. The plurality of RSUs are referred to the auxiliary RSUs 210, 220, 230, and 240 and the fifth RSU 250. The auxiliary RSUs 210, 220, 230, and 240 include the first RSU 210, the second RSU 220, the third RSU 230, and the fourth RSU 240. FIG. 2B additionally illustrates an estimated position 202 of the PM vehicle and a corrected position 204 of the PM vehicle.

Hereinafter, the fifth RSU 250 is described as a reference RSU for correction of the estimated position, but this is only one embodiment, and the reference RSU may be implemented by at least one of the first RSU 210, the second RSU 220, the third RSU 230, or the fourth RSU 240. Meanwhile, the auxiliary RSUs 210, 220, 230, and 240 are only an embodiment and may be constituted as at least three of the auxiliary RSUs. Position coordinates for the plurality of RSUs 210, 220, 230, 240, and 250 are assumed to be known in advance.

Hereinafter, it will be described that the fifth RSU 250 generates correction data. However, the correction data can be generated for each reference RSU by another device, and the reference RSU may be set to store and transmit the correction data.

The fifth RSU 250 receives messages from the auxiliary RSUs 210, 220, 230, and 240. The fifth RSU 250 calculates the distances between the fifth RSU 250 and the auxiliary RSUs 210, 220, 230, 240 based on at least one of the RSSI and the ToF of the received messages. At this time, the known positions of the auxiliary RSUs 210, 220, 230, and 240 are utilized.

Based on the distances between the fifth RSU 250 and the auxiliary RSUs 210, 220, 230, and 240, the fifth RSU 250 estimates its own position. That is, the fifth RSU 250 may derive the estimated position 252 of the fifth RSU 250.

However, the actual position and the estimated position 252 of the fifth RSU 250 may be not matched due to a signal distortion due to weather or obstacles, errors in the RSU, and the like. By obtaining, however, an error between the known actual position and the estimated position of the fifth RSU 250 and using the previously obtained error as the positioning correction data of the PM vehicle, the positioning device can accurately derive the actual position 200 of the PM vehicle.

In particular, the positioning device may accurately derive the actual position 200 of the PM vehicle using correction data including any one of a distance error ratio, a distance error, and a position error of the fifth RSU 250.

Hereinafter, a process of generating correction data in the order of a distance error ratio, a distance error, and a position error, and correcting the position of the PM vehicle using the correction data will be described.

As a first embodiment, in order to use the distance error ratio, the fifth RSU 250 calculates a distance $d_1'$ between the estimated position 252 of the fifth RSU and the position of the first RSU 210 based on at least one of the RSSI or the ToF of the messages received by the fifth RSU 250. The fifth RSU 250 further calculates a distance $d_1$ between the actual position of the fifth RSU 250 and the position of the first RSU 210.

The fifth RSU 250 calculates an error ratio (hereinafter, a first distance error ratio) between $d_1$ and $d_1'$. Here, the distance error ratio means the ratio of the actual distance to the estimated distance. That is, the distance error ratios are the actual distances over the estimated distances. For example, the first distance error ratio means a ratio of $d_1$ to $d_1'$. Additionally, the fifth RSU 250 has a second distance error ratio, a third distance error ratio, and a fourth distance error ratio for the second RSU 220, the third RSU 230, and the fourth RSU 240, respectively.

Referring to FIG. 2B, the positioning device may derive the corrected position 204 of the PM vehicle by correcting the estimated position 202 of the PM vehicle using the distance error ratio.

Specifically, the positioning device receives messages from the auxiliary RSUs 210, 220, 230, and 240. The positioning device may estimate the estimated position 202 of the PM vehicle based on at least one of the RSSI and the ToF of the received messages. In detail, the positioning device calculates the estimated position 202 of the PM vehicle through the triangulation or the trilateration based on at least three positions of the auxiliary RSUs 210, 220, 230, and 240, and the RSSI or the ToF of the messages received from three RSUs.

The positioning device obtains the distances between the estimated position 202 of the PM vehicle and the positions of the auxiliary RSUs 210, 220, 230, and 240. The distances from the estimated position 202 of the PM vehicle to the positions of the auxiliary RSUs 210, 220, 230, and 240 are $x_1'$, $x_2'$, $x_3'$, and $x_4'$, respectively.

Thereafter, the positioning device may receive the distance error ratios that are the correction data from the fifth RSU 250 that is the reference RSU. The distance error ratios mean distance error ratios between the fifth RSU 250 and the auxiliary RSUs 210, 220, 230, and 240.

The positioning device may obtain the corrected distances by multiplying the distance error ratio by the distances between the estimated position 202 of the PM vehicle and the positions of the auxiliary RSUs 210, 220, 230, and 240. For example, the positioning device may obtain $x_1''$ by multiplying $(d_1/d_1')$ by $x_1'$. Additionally, the positioning device may further obtain $x_2''$, $x_3''$, and $x_4''$.

The corrected distances from the estimated position 202 of the PM vehicle to the positions of the auxiliary RSUs 210, 220, 230, and 240 may be expressed as in Equation 1.

$$x'' = x' \times \frac{d}{d'} \qquad \text{Equation 1}$$

In Equation 1, x" denotes the corrected distance from the estimated position 202 of the PM vehicle to the positions of the auxiliary RSUs 210, 220, 230, and 240. x' denotes the distance from the estimated position 202 of the PM vehicle to the positions of the auxiliary RSUs 210, 220, 230, and 240. d denotes the distance from the actual position of the fifth RSU 250 to the auxiliary RSUs 210, 220, 230, and 240. d' denotes the distance from the estimated position 252 of the fifth RSU 250 to the positions of the auxiliary RSUs 210, 220, 230, and 240.

The positioning device may calculate the corrected position 204 of the PM vehicle through the triangulation or trilateration based on at least three of $x_1"$, $x_2"$, $x_3"$, and $x_4"$. Since the error between the actual distance and the estimated distance from the fifth RSU 250 to the auxiliary RSUs 210, 220, 230, and 240 is reflected in the estimated position 202 of the PM vehicle, the corrected position 204 of the PM vehicle is derived to be closer to the actual position 200 of the PM vehicle than the estimated position 202 of the PM vehicle.

The positioning device according to the embodiment of the present disclosure may correct the estimated position 202 of the PM vehicle using the error ratio for one of the RSSI or the ToF instead of the distance.

As a second embodiment, the positioning device may receive the distance errors as the correction data from the fifth RSU 250 that is the reference RSU. The distance errors mean distance errors between the fifth RSU 250 and the auxiliary RSUs 210, 220, 230, and 240.

In order to use the distance error, the positioning device calculates an error (hereinafter, a first distance error) between $d_1$ and $d_1'$. Specifically, the first distance error means a value obtained by subtracting $d_1'$ from $d_1$. Additionally, the positioning device calculates each of the second distance error, the third distance error, and the fourth distance error for the second RSU 220, the third RSU 230, and the fourth RSU 240.

Referring to FIG. 2B, the positioning device may derive the corrected position 204 of the PM vehicle by correcting the estimated position 202 of the PM vehicle using the distance error.

Specifically, the positioning device receives messages from the auxiliary RSUs 210, 220, 230, and 240. The positioning device may estimate the estimated position 202 of the PM vehicle based on at least one of the RSSI and the ToF of the received messages. In detail, the positioning device calculates the estimated position 202 of the PM vehicle through the triangulation or trilateration based on at least three positions of the auxiliary RSUs 210, 220, 230, and 240, and the RSSI or the ToF of the messages received from three RSUs. In this case, the distances from the estimated position 202 of the PM vehicle to the positions of the auxiliary RSUs 210, 220, 230, and 240 are $x_1'$, $x_2'$, $x_3'$, and $x_4'$, respectively.

The positioning device may obtain the respective corrected distances by adding the distance error to the distances between the estimated position 202 of the PM vehicle and the positions of the auxiliary RSUs 210, 220, 230, and 240. For example, the positioning device may obtain $x_1"$ by adding $(d_1-d_1')$ to $x_1'$. Additionally, the positioning device may further obtain $x_2"$, $x_3"$, and $x_4"$.

The distances from the estimated position 202 of the PM vehicle to the positions of the auxiliary RSUs 210, 220, 230, and 240 may be expressed as in Equation 2.

$$x"=x'+(d-d') \qquad \text{Equation 2}$$

The positioning device may calculate the corrected position 204 of the PM vehicle through the triangulation or trilateration based on at least three of $x_1"$, $x_2"$, $x_3"$, and $x_4"$. Since the error between the actual distance and the estimated distance from the fifth RSU 250 to the auxiliary RSUs 210, 220, 230, and 240 is reflected in the estimated position 202 of the PM vehicle, the corrected position 204 of the PM vehicle may be closer to the actual position 200 of the PM vehicle than the estimated position 202 of the PM vehicle.

The positioning device according to the embodiment of the present disclosure may correct the estimated position 202 of the PM vehicle using the error ratio for one of the RSSI or the ToF instead of the distance.

In a third embodiment, the positioning device may receive the position errors as the correction data from the fifth RSU 250 that is the reference RSU. The position error means a difference between the estimated position 252 and the actual position of the fifth RSU 250. To this end, the fifth RSU 250 calculates a position error meaning the difference between the actual position of the fifth RSU 250 and the estimated position 252 of the fifth RSU. Here, the position may mean two-dimensional position coordinates or three-dimensional position coordinates. The position error is calculated by calculations for each dimension.

After estimating the estimated position 202 of the PM vehicle, the positioning device may derive the corrected position 204 of the PM vehicle by correcting the estimated position 202 of the PM vehicle based on the position error for the fifth RSU 250. Specifically, each of the corrections may be performed by dividing the estimated position 202 of the PM vehicle into an x coordinate and a y coordinate.

Meanwhile, the positioning device may receive the distance error ratio, the distance error, and the position error between the fifth RSU 250 and the auxiliary RSUs 210, 220, 230, and 240 in real time or may calculate and store, in advance, the distance error ratio, the distance error, and the position error.

Through the above-described three error corrections, the positioning device may derive the accurate position of the PM vehicle.

Figure 3:
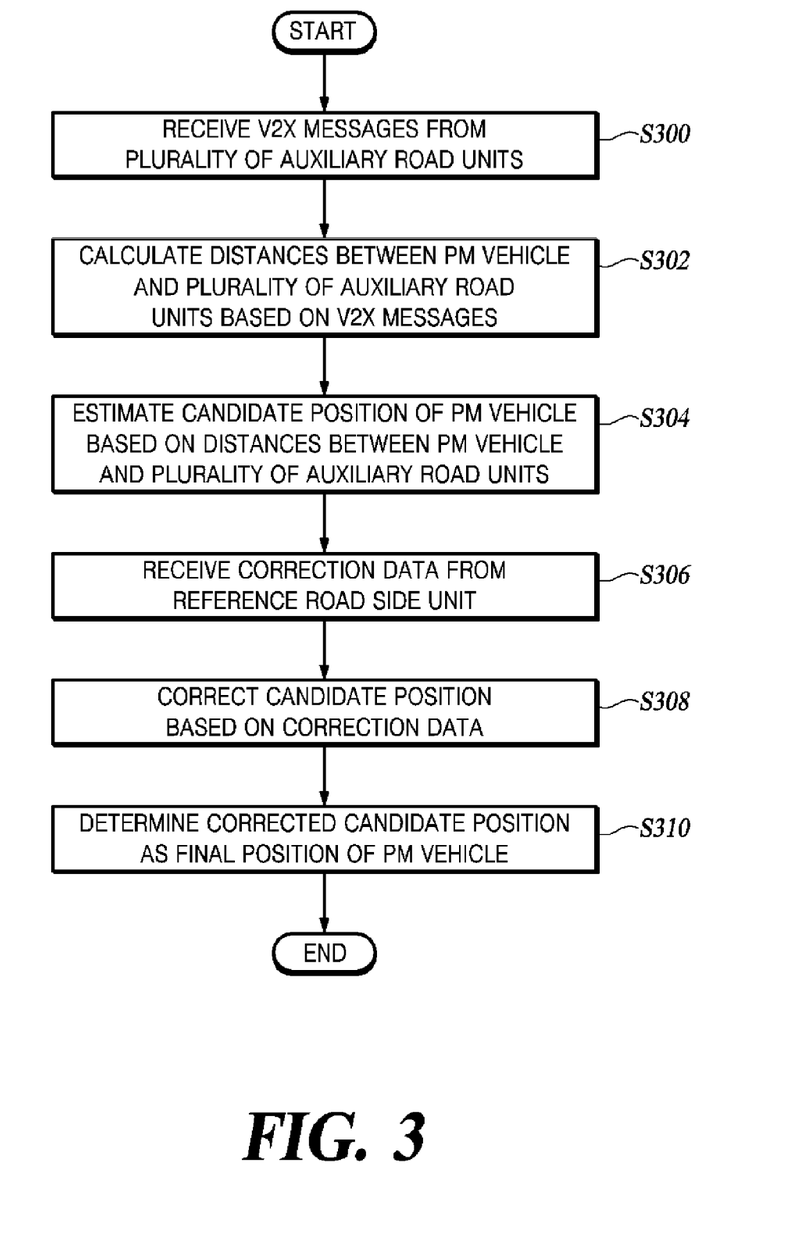
FIG. 3 is a flowchart for describing a positioning method according to an embodiment of the present disclosure.

FIG. 3 is a flowchart for describing a positioning method according to an embodiment of the present disclosure.

Referring to FIG. 3, the positioning device receives messages from a plurality of auxiliary RSUs at S300.

The positioning device obtains the distances between the PM vehicle and the plurality of auxiliary RSUs based on the messages at S302. According to an embodiment of the present disclosure, the positioning device may obtain the distances between the PM vehicle and the plurality of auxiliary RSUs based on at least one of the RSSI and the ToF of the messages.

The positioning device estimates a candidate position of the PM vehicle based on the distances between the PM vehicle and the plurality of auxiliary RSUs at S304. Specifically, the candidate position of the PM vehicle may be estimated through the triangulation or trilateration based on the distances between the PM vehicle and the plurality of auxiliary RSUs, and the known positions of the plurality of auxiliary RSUs.

The positioning device receives correction data from the reference RSU at S306. Here, the correction data means any one of distance error ratios between the reference RSU and the plurality of auxiliary RSUs, distance errors between the reference RSU and the plurality of auxiliary RSUs, and a position error of the reference RSU.

Specifically, the distance error ratios mean the ratios of the actual distances to the estimated distances between the reference RSU and the plurality of auxiliary RSUs. The distance errors mean differences between the actual distances and the estimated distances from the reference RSU to the plurality of auxiliary RSUs. The position error means the difference between the estimated position and the actual position of the reference RSU.

The positioning device corrects the candidate position based on the correction data at S308.

The positioning device determines that the corrected candidate position is the final position of the PM vehicle at S310.

Although it is described in FIG. 3 that operations S300 to S310 are sequentially executed, this is merely illustrative of the technical idea of an embodiment of the present disclosure. In other words, those of ordinary skill in the technical field to which an embodiment of the present disclosure belongs may change the order described in FIG. 3 within a range that does not deviate from the essential characteristics of an embodiment of the present disclosure or will be able to apply various modifications and variations to executing one or more of the operations S300 to S310 in parallel, and therefore, FIG. 3 is not limited to a time-series order.

Meanwhile, the operations illustrated in FIG. 3 can be implemented as computer-readable codes on a computer-readable recording medium. The computer readable recording medium may include all kinds of recording apparatuses in which data that may be read by a computer system are stored. That is, the computer-readable recording medium may be a non-transitory medium such as a Read-Only Memory (ROM), a Random-Access Memory (RAM), a Compact Disc (CD)-ROM, a magnetic tape, a floppy disk, or an optical data storage device. In addition, the computer readable recording media may be distributed in computer systems connected to each other through a network such that the computer readable codes may be stored and executed in the computer readable recording media in a distributed scheme.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

As described above, according to an embodiment of the present disclosure, the device and the method for positioning personal mobility vehicle can estimate an accurate position of a PM vehicle using a plurality of RSUs and V2X communication even in a Global Navigation Satellite System (GNSS) dead-zone or an area where diffused reflection of a satellite signal is severe.

According to an embodiment of the present disclosure, the device and the method for positioning personal mobility vehicle can provide various services such as a PM vehicle sharing service and a PM vehicle multi-modal service by accurately estimating a position of a PM vehicle.

The invention claimed is:

1. A positioning method implemented by a computer, comprising:
   receiving, via a communication unit, messages from a plurality of auxiliary road side units;
   obtaining, via a control unit, distances between a Personal Mobility (PM) vehicle and the plurality of auxiliary road side units based on the messages;
   estimating a candidate position of the PM vehicle based on the distances between the PM vehicle and the plurality of auxiliary road side units;
   receiving correction data, wherein the correction data is any one of distance error ratios between the reference road side unit and the plurality of auxiliary road side units, distance errors between the reference road side unit and the plurality of auxiliary road side units, and a position error of the reference road side unit, wherein the position error is a difference between an estimated position and an actual position of the reference road side unit;
   correcting the candidate position based on the correction data; and
   determining the corrected candidate position as a final position of the PM vehicle.

2. The positioning method of claim 1, wherein the distance error ratios are ratios of actual distances to estimated distances between the reference road side unit and the plurality of auxiliary road side units.

3. The positioning method of claim 1, wherein the distance errors are differences between actual distances and estimated distances from the reference road side unit to the plurality of auxiliary road side units.

4. The positioning method of claim 1, wherein the obtaining of the distances between the PM vehicle and the plurality of auxiliary road side units includes obtaining distances between the PM vehicle and the plurality of auxiliary road side units based on at least one of a Received Signal Strength Indicator (RSSI) and a Time of Flight (ToF) of the messages.

5. A positioning device comprising:
   a communication unit configured to communicate with a plurality of auxiliary road side units through messages, and to receive correction data; and
   a control unit configured to:
      obtain distances between a Personal Mobility (PM) vehicle and the plurality of auxiliary road side units based on the messages;
      estimate a candidate position of the PM vehicle based on the distances between the PM vehicle and the plurality of auxiliary road side units;
      correct the candidate position based on the correction data, wherein the correction data is any one of distance error ratios between the reference road side unit and the plurality of auxiliary road side units, distance errors between the reference road side unit and the plurality of auxiliary road side units, and a position error of the reference road side unit, wherein the position error is a difference between an estimated position and an actual position of the reference road side unit; and determine the corrected candidate position as a final position of the PM vehicle.

6. The positioning device of claim 5, wherein the distance error ratios are ratios of actual distances to estimated distances between the reference road side unit and the plurality of auxiliary road side units.

7. The positioning device of claim 5, wherein the distance errors are differences between actual distances and estimated distances from the reference road side unit to the plurality of auxiliary road side units.

8. The positioning device of claim 5, wherein the control unit is further configured to obtain distances between the PM vehicle and the plurality of auxiliary road side units based on at least one of a Received Signal Strength Indicator (RSSI) and a Time of Flight (ToF) of the messages.

\* \* \* \* \*